United States Patent
Poston et al.

(10) Patent No.: US 8,674,992 B2
(45) Date of Patent: Mar. 18, 2014

(54) SPOTLIGHT GRAPHS

(75) Inventors: Ricky L. Poston, Austin, TX (US); Jason L. Graham, Austin, TX (US)

(73) Assignee: BMC Software, Inc., Houston, TX (US)

( * ) Notice: Subject to any disclaimer, the term of this patent is extended or adjusted under 35 U.S.C. 154(b) by 281 days.

(21) Appl. No.: 12/835,911

(22) Filed: Jul. 14, 2010

(65) Prior Publication Data

US 2011/0316856 A1     Dec. 29, 2011

Related U.S. Application Data

(60) Provisional application No. 61/358,316, filed on Jun. 24, 2010.

(51) Int. Cl.
*G06T 11/20* (2006.01)

(52) U.S. Cl.
USPC .......... 345/440; 714/37; 714/57; 714/48; 715/837; 345/441; 370/242; 370/245; 370/241; 709/224; 709/223

(58) Field of Classification Search
None
See application file for complete search history.

(56) References Cited

U.S. PATENT DOCUMENTS

| | | | |
|---|---|---|---|
| 5,929,864 A * | 7/1999 | Picott et al. | 345/440 |
| 6,182,249 B1 * | 1/2001 | Wookey et al. | 714/47.2 |
| 6,356,285 B1 * | 3/2002 | Burkwald et al. | 715/853 |
| 6,425,006 B1 * | 7/2002 | Chari et al. | 709/224 |
| 6,590,587 B1 * | 7/2003 | Wichelman et al. | 715/736 |
| 6,639,614 B1 * | 10/2003 | Kosslyn et al. | 715/837 |
| 7,379,061 B2 * | 5/2008 | Castonguay et al. | 345/420 |
| 2004/0252128 A1 * | 12/2004 | Hao et al. | 345/581 |
| 2007/0211056 A1 * | 9/2007 | Chakraborty et al. | 345/440 |
| 2009/0076992 A1 * | 3/2009 | Goris et al. | 706/21 |
| 2009/0217099 A1 * | 8/2009 | Kato | 714/37 |
| 2009/0313219 A1 * | 12/2009 | Gupta et al. | 707/3 |
| 2010/0177650 A1 * | 7/2010 | Wittgreffe | 370/252 |
| 2011/0148880 A1 * | 6/2011 | De Peuter | 345/440 |
| 2012/0036484 A1 * | 2/2012 | Zhang et al. | 715/853 |
| 2012/0053986 A1 * | 3/2012 | Cardno et al. | 705/7.29 |

OTHER PUBLICATIONS

Martin Wattenberg, "Visual Exploration of Multivariate Graphs" Proceedings of ACM CHI 2006 Conference on Human Factors in Computing SystemsACM Press (2006), p. 811-819.*
Severity, Macmillan Dictionary and Thesaurus, [retrieved on Aug. 15, 2013], Retrieved from the Internet <URL:http://www.macmillandictionary.com/thesaurus/british/severity#severity_5>.*
The Quality of Being Serious, Severe, or Extreme, Macmillan Dictionary, [retrieved on Aug. 15, 2013], Retrieved from the Internet <URL:http://www.macmillandictionary.com/thesaurus-category/british/The-quality-of-being-serious-severe-or-extreme>.*
Cecchet et al., Performance Debugging in Data Centers: Doing More with Less, Communication Systems and Networks and Workshops (Feb. 2009).*

* cited by examiner

*Primary Examiner* — Xiao M. Wu
*Assistant Examiner* — Greg Raburn

(57) ABSTRACT

In a computer-displayed graph, indications of multiple attributes or states of an object represented by a node of the graph are displayed using a spotlight, in which attributes of the spotlight correspond to attributes of the object represented by the node. The attributes of the spotlight each correspond to an attribute of the object and may include the color, brightness, and size of the spotlight. The spotlight may be positioned with the node, including overlaying the spotlight on the node and positioning the spotlight relative to the node.

16 Claims, 6 Drawing Sheets

SPOTLIGHT GRAPHS

CROSS REFERENCE TO RELATED APPLICATIONS

This Application claims priority to U.S. Provisional Application Ser. No. 61/358,316 entitled "Spotlight Graphs" filed Jun. 24, 2010 and which is incorporated by reference in its entirety herein.

BACKGROUND

This disclosure relates generally to the field of management of information technology (IT) services. More particularly, but not by way of limitation, it relates to a technique for improving usability of IT service models.

Business Service Management (BSM) is a methodology of viewing technology infrastructure administration and problem diagnosis from the perspective of its impact on critical business services rather than technology silos. One aspect of BSM involves the development of service models that model the IT services of the enterprise, with component elements of the service model representing business users, services, and IT infrastructure components that provide the services, such as software and hardware components.

On a high level, a service model is a collection of components that represent a business service. A business service can have one or more business processes. Each business process can contain several functional applications, each of which can have multiple IT components. A service model will contain the processes, show how the components are interconnected, and show how component failures propagate and impact the upstream services.

Service models in today's IT environment are typically complex, containing potentially thousands of underlying dependent services and IT components. The representation of these services and IT components is typically done using directed acyclic graphs (DAGs), where each component of the service model, whether a business user, a service component, or an IT infrastructure component, is represented as a node in the graph. For big service models, however, the visualization aspect may become challenging for the user. On one hand, complex user interface (UI) components can be used to provide as much data as possible about the service model elements so that all information is available to the user without requiring too much screen switching. On the other hand, the complexity of the service models makes it difficult to present the most important data given the limited screen display area that is available.

Furthermore, graphs of complex service models can be very large and difficult to navigate and view. Graph views are used to show the relationships between objects in a service model. Frequently they are also used to monitor the status of the objects in the service model. If a graph view is used for monitoring objects in a service model, such as configuration item (CI) objects in a Configuration Management Database graph, monitoring data is typically shown by placing multiple smaller icons next to the larger CI object icon. For example, these icons may show status, importance rating, events information, and whether an SLA is being violated, among others.

One common function performed by an information technology (IT) organization of an enterprise is to monitor the performance of the IT infrastructure. A typical enterprise-wide infrastructure includes database servers, web servers, application servers etc. and network devices like routers, switches etc. Performance monitoring of such an infrastructure may involve monitoring a very large number of metrics, with the need to monitor over a million metrics in many enterprises. As the amount of data shown by the graph (number of CIs and number of metrics monitored) increases, the graph objects can get very complex with the addition of the all the surrounding indicator icons. Users must scan many different icons in the graph and memorize what all the different metrics icons mean. Users frequently need to try to determine the relative importance of each "in trouble" object, so that they can prioritize their work. This is difficult because they must mentally assimilate all of the various icons on each object, to reach a single mental importance rating. They must then do the same for all the other objects in trouble. User must then mentally compare in their minds the importance of all of the different objects. This can be a difficult, memory intensive task. In addition, when viewing from a long distance, such as at a large screen operations center display, the smaller data icons are difficult to see.

SUMMARY

In one embodiment, a method is disclosed. The method comprises displaying a graph on a display screen, the graph comprised of a plurality of nodes, each of the plurality of nodes representing an object of a plurality of objects; and displaying a spotlight with a node of the plurality of nodes, the spotlight having a plurality of characteristics, corresponding to a plurality of attributes of an object of the plurality of objects represented by the node.

In another embodiment, a networked computer system is disclosed. The networked computer system comprises a first computer system, configured to generate a graph comprising a plurality of nodes, each node of the plurality of nodes modeling an object of a plurality of objects; a second computer system, communicatively coupled to the first computer system, configured to display the graph generated by the first computer system; and a first software, configured to represent a plurality of states corresponding to a node of the graph with a graphical image positioned with the node, the graphical image having a plurality of attributes, each representing a state of the plurality of states.

In yet another embodiment, a computer-readable medium is disclosed. The computer-readable medium stores instructions for a programmable control device that cause a programmable control device to perform the method described above.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Various embodiments of the present invention replace some or all of the metric indicator icons with a single colored spotlight that appears behind the object, reducing the mental workload of determining the relative importance of multiple objects in the graph view.

Figure 1:
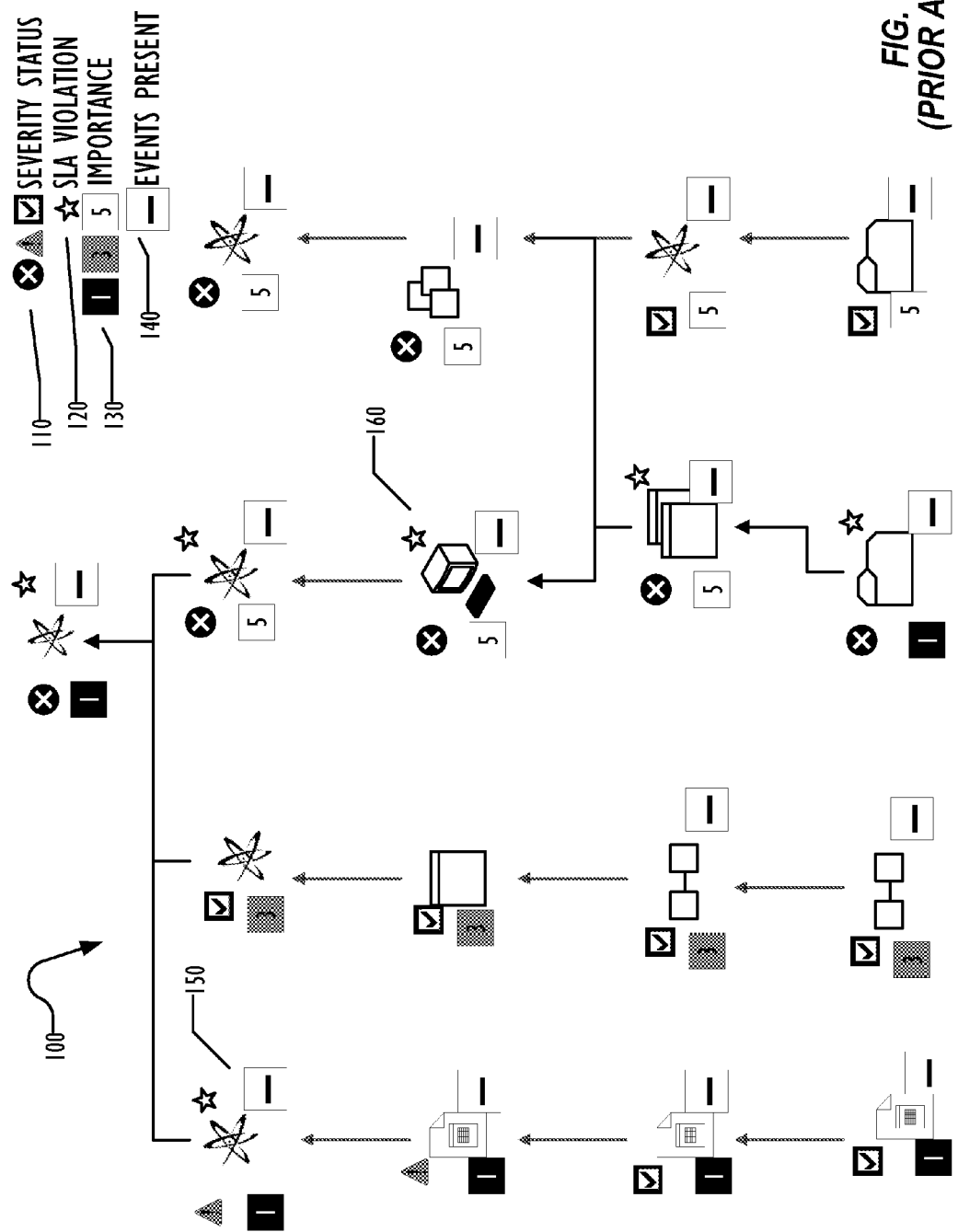
FIG. 1 illustrates, in graph form, an example of a service model graph according to the prior art.

FIG. 1 is a graph 100 illustrating a service model displayed according to the prior art. In this example, for icon groups are defined: severity status 110, Service Level Agreement (SLA) violation 120, importance 130, and events present 140. Various nodes of the graph 100 were presented with up to 4 icons from the icon groups 110, 120, 130, and 140. For example, node 150 is illustrated with 4 associated icons, as is node 160, indicating that node 150 has attributes or states corresponding to those associated icons. A user of the service model graph 100 may have difficulty deciding whether the conditions indicated by the icons associated with node 150 are of greater concern or urgency than the conditions indicated by the icons associated with node 160.

Figure 2:
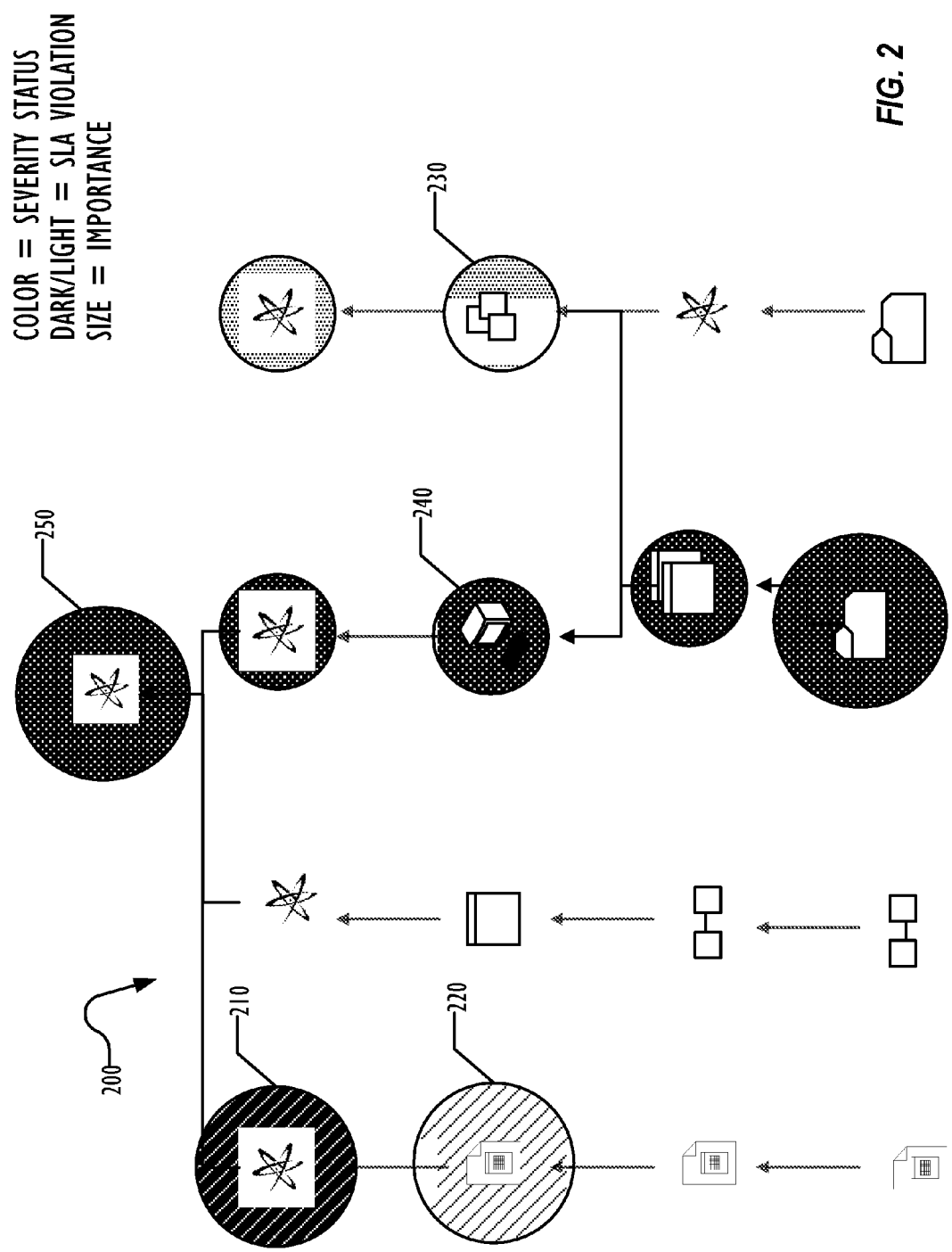
FIG. 2 illustrates, in graph form, a service model graph using spotlights according to one embodiment.

FIG. 2 is a block diagram of a service model graph 200 using spotlights according to one embodiment. In this embodiment, this spotlight may vary in three dimensions: color, size, and brightness. These three dimensions may encode three metrics on an object and remove the need for three indicator icons. The spotlights also have the advantage of being easily visible from a much longer distance. Their meaning is much easier to understand and compare than the original plurality of icons because of the simple graphical encoding of the data. The encoding may eliminate or reduce the need to memorize and compare the individual metrics icons, although in some embodiments, one or more additional icons may still be associated with the graph nodes. Therefore, the mental workload of the viewer may be greatly reduced. The spotlights make establishing a mental ranking of the importance of each object very easy to do, simply by looking at the relative size, color, and brightness of the spotlights behind each monitored object. The spotlight technique may preserve all of the normal graph functions that allow users to view, open, and close relationship branches among objects.

In this embodiment, the color of the spotlight indicates a severity status associated with the corresponding node, as illustrated with—shaded spotlights indicating a higher severity status than diagonal line shaded spotlights. The dot-shaded spotlights 230, 240, and 250 may be implemented using red, while the diagonal line shaded spotlights 210 and 220 may be implemented using yellow. The spotlight may be dark or light depending upon whether an SLA violation has occurred at the corresponding node. The size of the spotlight may correspond to an importance of the node, as illustrated, with more important nodes having a larger spotlight than less important nodes.

As illustrated in FIG. 2, these dimensions or characteristics may be combined. Thus, for example, spotlight 210 is diagonal line shaded, dark, and large, indicating that the corresponding node is of high importance, an SLA violation has occurred, and the severity of the incident affecting the corresponding node is low. Spotlight 220 similarly indicates that the corresponding node is of high importance, no SLA violation has occurred, and the severity of the incident affecting the corresponding node is low. Spotlight 230 indicates that the incident severity is high, no SLA violation has occurred, and the corresponding node is of low importance. Spotlight 240 indicates that the incident severity is high, an SLA violation has occurred, and the corresponding node is of low importance. Spotlight 250 indicates that the incident severity is high, an SLA violation has occurred, and the corresponding node is of high importance.

In the example illustrated in FIG. 2, only 2 different sizes, colors, and brightness levels of the spotlight are used, for ease of recognition, giving six different possible values for the spotlight. In other embodiments, additional gradations of size, color, or brightness may be used. However, a spotlight designer preferably will limit the number of possible states for the spotlight for ease of use. Using two color choices, such as red and yellow, although limited in the number of states that can be represented, may be preferable to an implementation that uses aqua, lime, yellow, orange, red, and magenta, which may be harder for some users to distinguish and may present too many choices to be easy to use. Similarly, a spotlight designer may need to consider issues such as red-green color blindness when deciding what colors to use for the spotlights.

In other embodiments, additional dimensions such as shape may be used, such as using triangles, squares, and the circles to represent some tri-valued characteristic that may be associated with a node of the service model graph. Again, however, small numbers of possible values are generally preferable than large numbers, for ease of quick recognition by a user. Furthermore, the more dimensions that are built into the spotlight, the more difficult those dimensions may be for a user to integrate when evaluating spotlights associated with nodes of the service model graph.

In one embodiment, this spotlight varies in three dimensions: color, size, and brightness. These 3 dimensions can encode 3 metrics on an object and remove the need for the 3 indicator icons. The spotlights also have the advantage of being easily visible from a much longer distance. Their meaning is much easier to understand and compare than the original plurality of icons because of the simple graphical encoding of the data. The encoding eliminates the need to memorize and compare the individual metrics icons, although in some embodiments, one or more additional icons may still be associated with the graph nodes. Therefore, the mental workload of the viewer is greatly reduced. The spotlights make establishing a mental ranking of the importance of each object very easy to do, simply by looking at the relative size, color, and brightness of the spotlights behind each monitored object. The spotlight techniques preserve all of the normal graph functions that allow users to view, open, and close relationship branches among objects.

Figure 3:
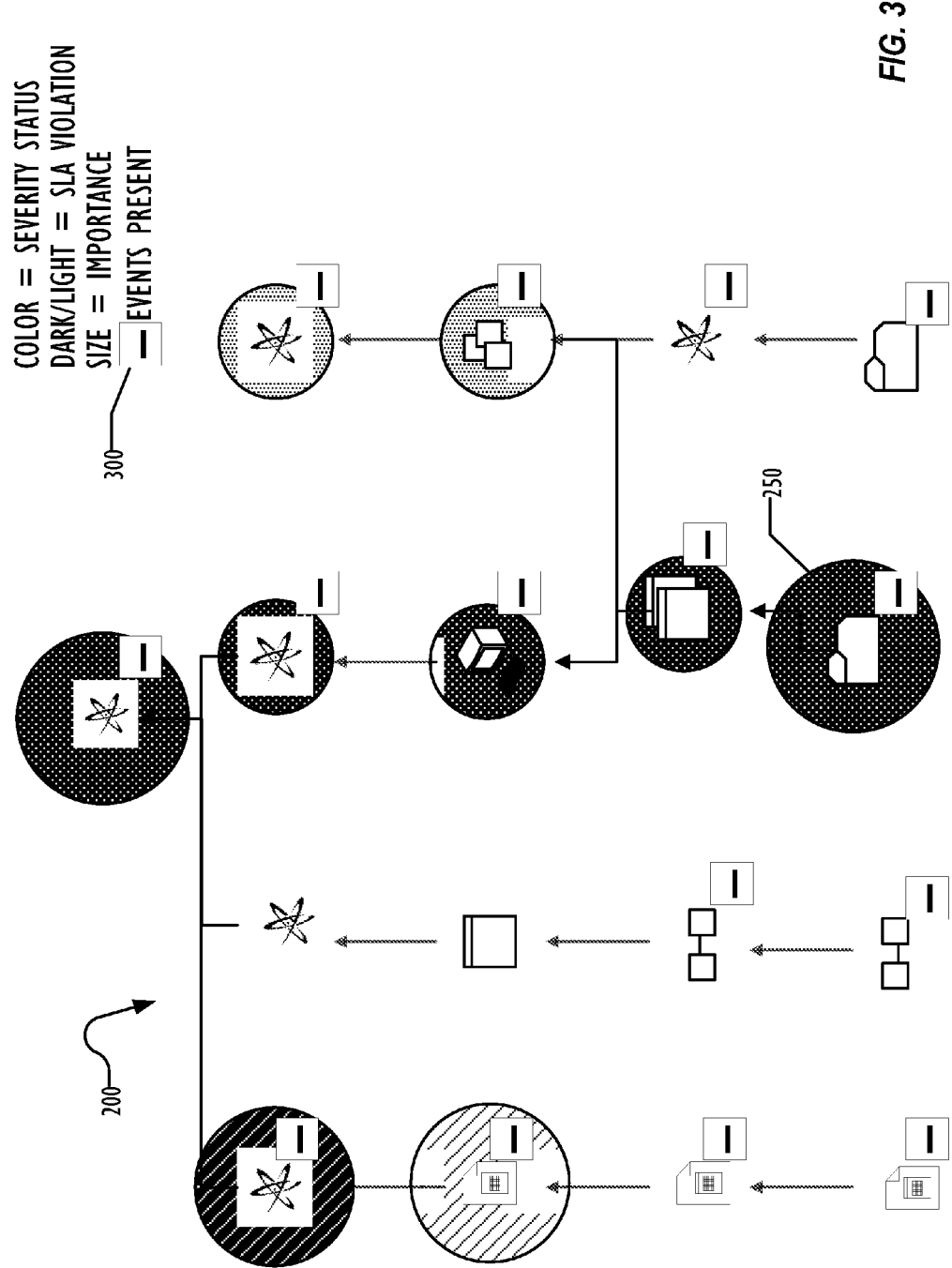
FIG. 3 illustrates, in graph form, a service model graph using spotlights and icons according to one embodiment.

FIG. 3 illustrates another embodiment in which the graph 200 and spotlights described above are combined with conventional icons such as were used in the graph 100 of FIG. 1. In the example illustrated in FIG. 3, icon 300 is associated with nodes of the graph 200 to indicate that events associated with that node are present. In this embodiment, a user may make decisions based upon either or both of the spotlights and the icon 300.

The embodiments disclosed above use shading or color differences, brightness differences, and size differences to indicate states to be associated with a graph node. Other types of spotlights may be used, using other characteristics as dimensions of the spotlight. For example, hue, saturation, and brightness may be used in some embodiments as spotlight characteristics. In an embodiment without color graphics, such as in FIGS. 1-4, shading, patterns, or cross-hatching may be used instead of color.

In some embodiments, a user may configure the service model graph to switch between showing icons and the spotlights. In addition, embodiments may allow configuration of which icons are to be eliminated in favor of the spotlights or are to be displayed with the spotlights. Such configuration may occur on demand, in response to a user command or interaction with the graph, or may be configured by a parameter or other similar persistent display preference setting.

Figure 4:
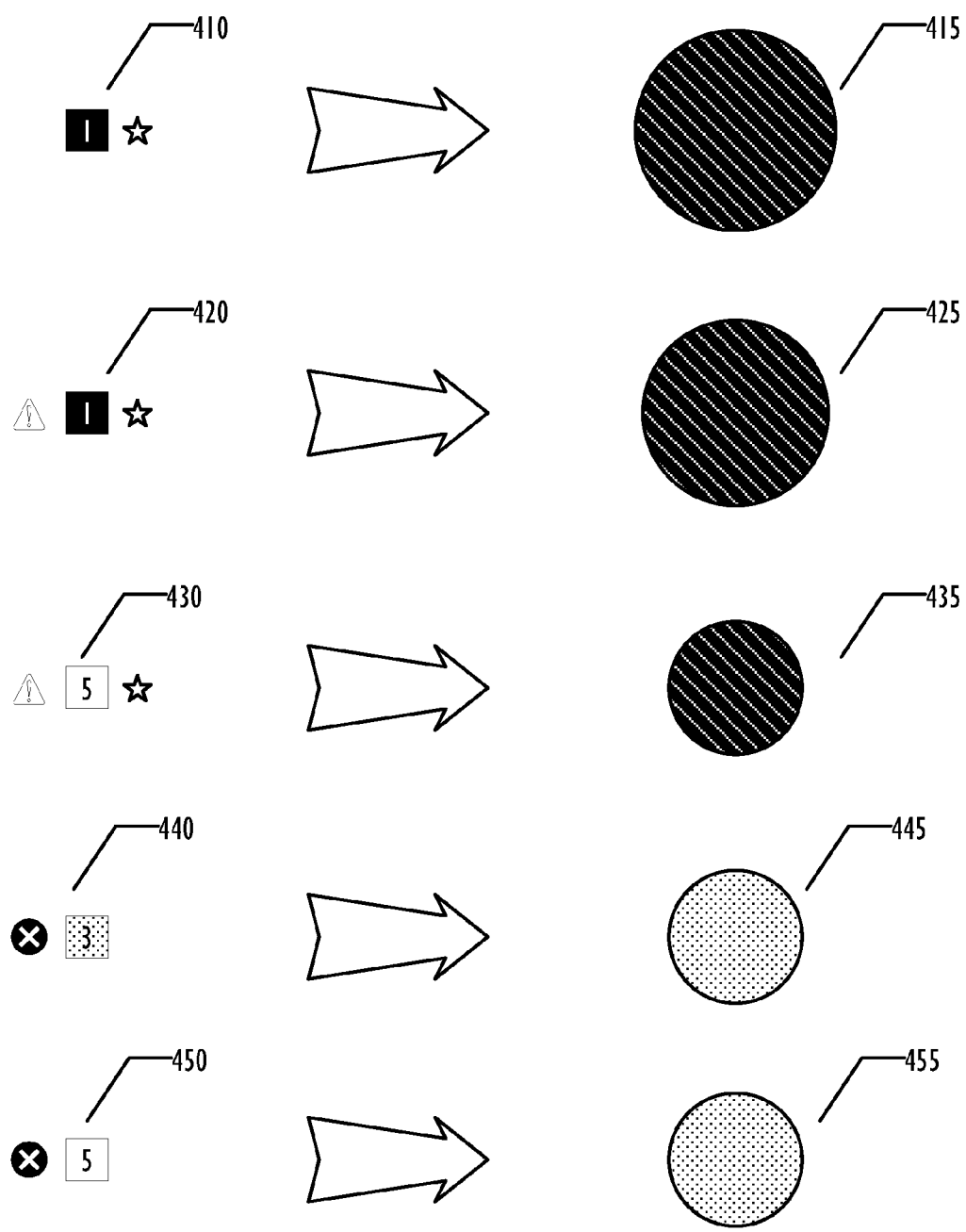
FIG. 4 illustrates, in block diagram form, a mapping of icons to spotlights according to one embodiment.

As illustrated in FIG. 4, depending on the implementation choices made by the spotlight designer, there may or may not be a one-to-one mapping between the multiple icons and states of the spotlight. In the embodiment illustrated in FIG. 4, icon collection 410 has no icon for severity status, an icon indicating high importance, and an icon indicating that an SLA violation has occurred. This may be mapped into a spotlight 415 that is dark, diagonal-shaded, and large. Icon collection 420 has an icon indicating a low severity status, an icon indicating high importance, an icon indicating that an SLA violation has occurred. This may be mapped into a spotlight 425 that is dark, diagonal-shaded, and large, the same as spotlight 415. Icon collection 430 has an icon indicating low severity status, an icon indicating low importance, and an icon indicating that an SLA violation has occurred. This may be mapped into a spotlight 435 that is dark, diagonal-shaded, and small. Icon collection 440 has an icon indicating high severity status, an icon indicating medium importance, and no icon indicating an SLA violation. This may be mapped into a spotlight 445 that is light, dot-shaded, and small. Icon collection 450 has an icon indicating high severity status, an icon indicating low importance, and no icon indicating an SLA violation. This may be mapped into a spotlight 455 that is light, dot-shaded, and small, similar to the spotlight 445. While the mapping from icon collections into spotlights may eliminate certain informational distinctions, users may be able to use the spotlights more effectively because of the lower level of mental work necessary to consider them.

The spotlights may be implemented using any graphical technique known to the art for placing a graphical image over or below another image on a screen. If placed over the representation of the node, transparency may be used to allow the node to be visible in the spotlight, shaded by the spotlight coloring. Other graphical display manipulations may be used to achieve desired effects.

Although described above and illustrated in the figures as co-located with the graph node, the spotlights may be positioned anywhere relative to the node, including positions where the spotlight intersects, but does not surround the node, as well as positions where the spotlight does not intersect, but is separately positioned relative to the node.

Although described herein in terms of service model graphs, the disclosed techniques are not so limited, and may be used in other types of graphs, and in any situation where the desire may arise to replace multiple icons or symbols may in a display with a simpler, more easily usable representation of multiple characteristics.

Figure 5:
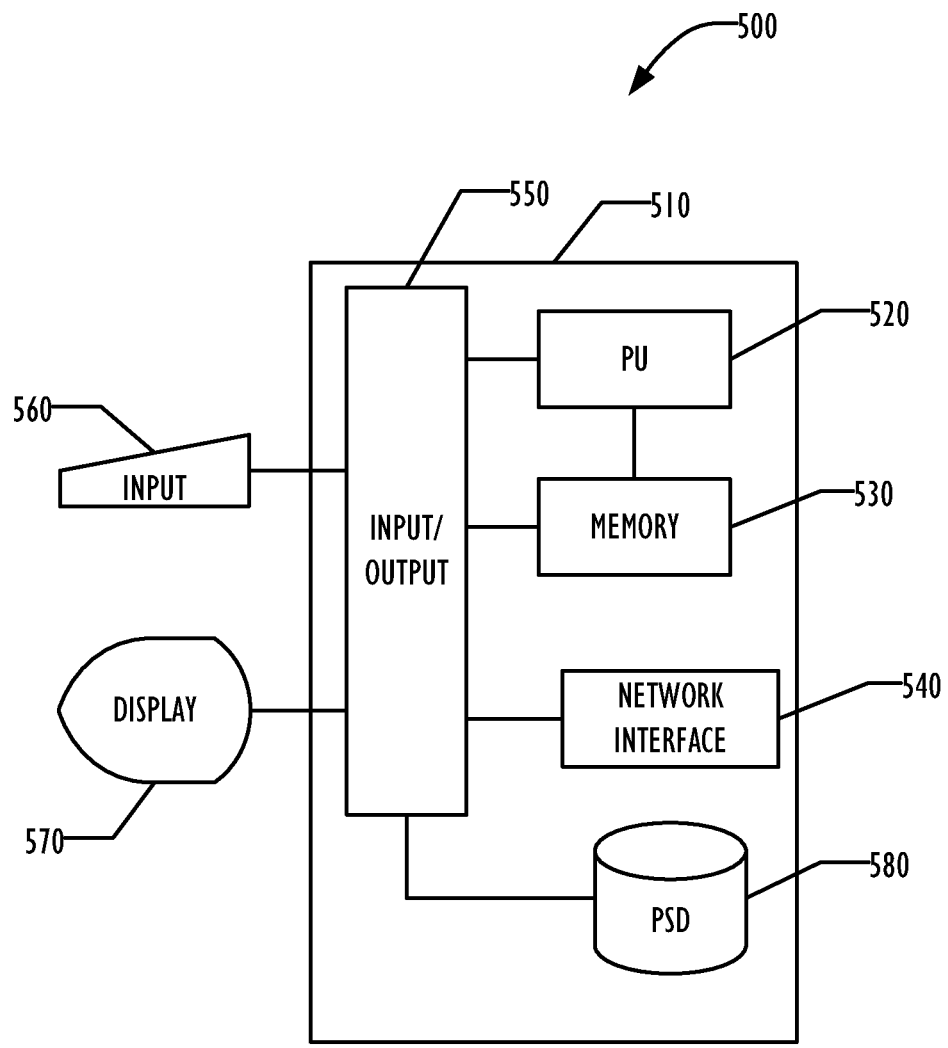
FIG. 5 illustrates, in block diagram form, a computing device for generating and displaying the service model graph and spotlights according to one embodiment.

Referring now to FIG. 5, an example computer 500 for use in providing a spotlights for use with graph nodes is illustrated in block diagram form. Example computer 500 comprises a system unit 510 which may be optionally connected to an input device or system 560 (e.g., keyboard, mouse, touch screen, etc.) and display 570. A program storage device (PSD) 580 (sometimes referred to as a hard disc) is included with the system unit 510. Also included with system unit 510 is a network interface 540 for communication via a network with other computing and corporate infrastructure devices (not shown). Network interface 540 may be included within system unit 510 or be external to system unit 510. In either case, system unit 510 will be communicatively coupled to network interface 540. Program storage device 580 represents any form of non-volatile storage including, but not limited to, all forms of optical and magnetic, including solid-state, storage elements, including removable media, and may be included within system unit 510 or be external to system unit 510. Program storage device 580 may be used for storage of software to control system unit 510, data for use by the computer 500, or both.

System unit 510 may be programmed to perform methods in accordance with this disclosure. System unit 510 comprises a processor unit (PU) 520, input-output (I/O) interface 550 and memory 530. Processing unit 520 may include any programmable controller device including, for example, one or more members of the Intel Atom®, Core®, Pentium® and Celeron® processor families from Intel Corporation and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Memory 530 may include one or more memory modules and comprise random access memory (RAM), read only memory (ROM), programmable read only memory (PROM), programmable read-write memory, and solid-state memory. One of ordinary skill in the art will also recognize that PU 520 may also include some internal memory including, for example, cache memory.

Figure 6:
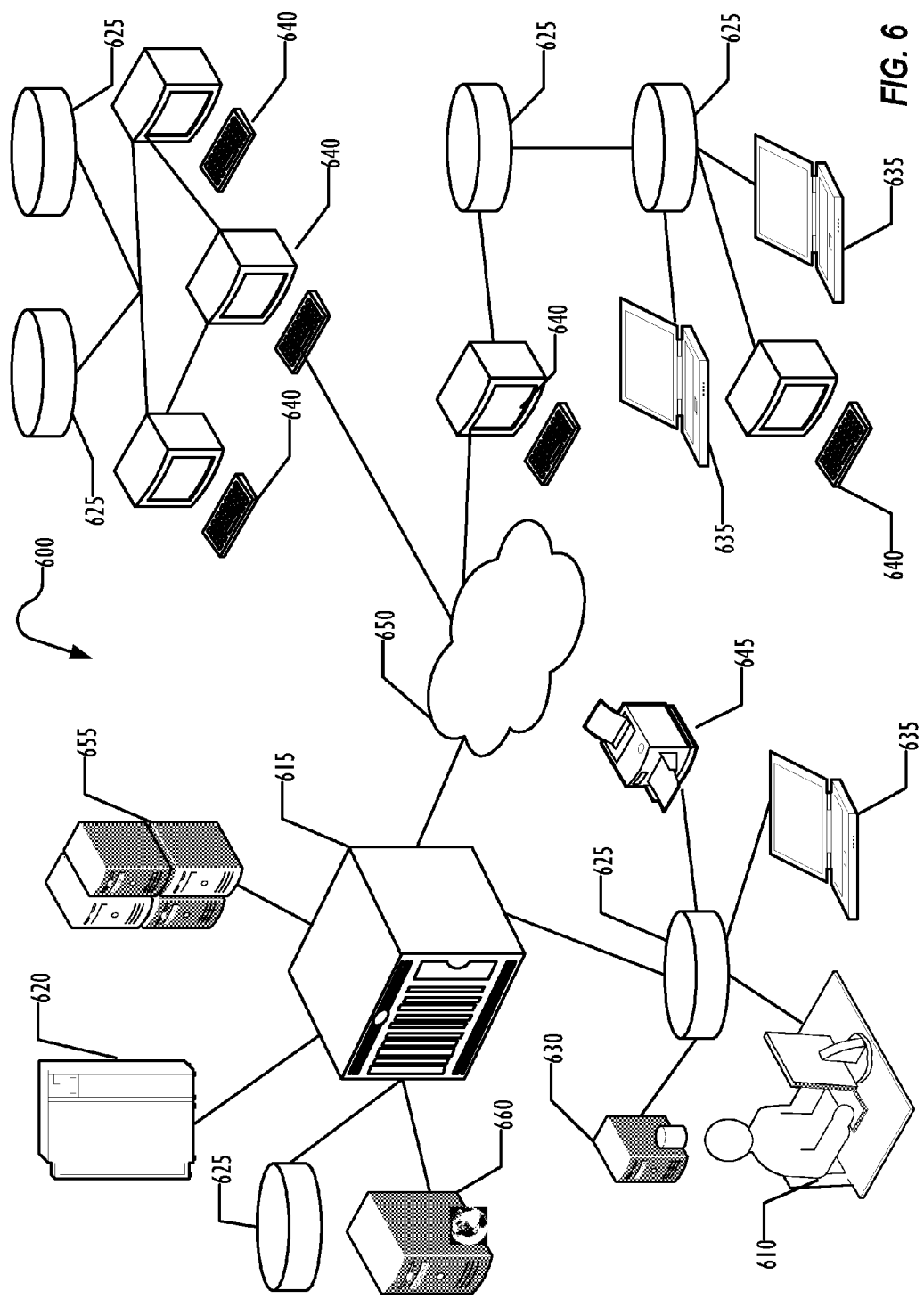
FIG. 6 illustrates, in block diagram form, a network corresponding to an information technology infrastructure that provides access to service model graphs that incorporate spotlights according to one embodiment.

FIG. 6 is a block diagram illustrating an IT infrastructure FIG. 600 that may include elements that provides access to service model graphs that incorporate spotlights as disclosed above. A user FIG. 610 may use a terminal or workstation to access service model graph software to display a service model graph such as illustrated in FIG. 1 on a display associated with the workstation. The software generating the graphical display of the service model graph on the user FIG. 610 workstation display, including the spotlights, may execute on the workstation for the user FIG. 610 or on other computing resources of the IT infrastructure FIG. 600, such as a mainframe FIG. 620, a web server FIG. 660, a database server FIG. 630, an application server FIG. 655, and other workstations FIG. 640, laptops FIG. 635. The IT infrastructure FIG. 600 may include one or more databases FIG. 625 that store data related to the service model graph corresponding to the organizational elements, services, IT hardware, and IT software that are modeled by the service model. The IT infrastructure may further include other IT resources, such as a printer FIG. 645. The IT infrastructure may be connected in any way known to the art, including using switches or routers FIG. 615 and networks FIG. 650.

It is to be understood that the above description is intended to be illustrative, and not restrictive. For example, the above-described embodiments may be used in combination with each other. Many other embodiments will be apparent to those of skill in the art upon reviewing the above description.

The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method, comprising:
displaying a graph on a display screen, the graph including a plurality of nodes, each of the plurality of nodes representing a service of a plurality of services;
determining a metric for each of a plurality of attributes associated with a service level agreement (SLA) for each of the plurality of services, the plurality of attributes including at least one SLA violation, a severity of the incident causing the SLA violation and an importance of the corresponding service; and
displaying a spotlight with each of the nodes of the plurality of nodes, the spotlight including a plurality of characteristics, each of the plurality of characteristics corresponding to one of the attributes of the service of the plurality of services represented by the node, the displayed spotlight being graphically varied based on the determined metric such that,
a size of the spotlight varies based on the importance of the corresponding service, and
a color of the spotlight varies based on the severity of the incident causing the SLA violation.

2. The method of claim 1, wherein
a brightness of the spotlight varies based on the at least one SLA violation.

3. The method of claim 1, further comprising:
displaying an icon corresponding to another attribute of the service represented by the node.

4. The method of claim 1, wherein the act of displaying a spotlight with a node of the plurality of nodes comprises:
overlaying the node with the spotlight.

5. The method of claim 1, wherein the act of displaying a spotlight with a node of the plurality of nodes comprises:
overlaying the spotlight with the node.

6. The method of claim 1, wherein the act of displaying a spotlight with a node of the plurality of nodes comprises:
positioning the spotlight relative to the node on the display screen.

7. A non-transitory computer readable medium with instructions for a programmable control device stored thereon wherein the instructions cause the programmable control device to perform the method of claim 1.

8. A networked computer system, comprising:
a first computer system configured to generate a graph including a plurality of nodes, each node of the plurality of nodes modeling a service of a plurality of services;
a second computer system, communicatively coupled to the first computer system, configured to display the graph generated by the first computer system; and
a first software configured to,
determine a metric for each of a plurality of states associated with a service level agreement (SLA) for each of the plurality of services, the plurality of states including at least one SLA violation, a severity of the incident causing the SLA violation and an importance of the corresponding service, and
represent the plurality of states with a variable graphical image positioned with the node, the graphical image having a plurality of attributes, each attribute representing a state of the plurality of states and an importance of the node, each of the attributes being varied based on the determined metric for each associated state such that,
a size of the variable graphical image varies based on the importance of the corresponding service, and
a color of the variable graphical image varies based on the severity of the incident causing the SLA violation.

9. The networked computer system of claim 8, wherein the first software is executed by the first computer system.

10. The networked computer system of claim 8, wherein the first software is executed by the second computer system.

11. The networked computer system of claim 8, wherein the graphical image is overlaid on the node.

12. The networked computer system of claim 8, wherein
a brightness of the variable graphical image varies based on the at least one SLA violation.

13. The networked computer system of claim 8, further comprising:
a second software, configured to represent a state corresponding to the node of the graph with a graphical image positioned with the node, the state not one of the plurality of states.

14. The networked computer system of claim 8, further comprising: a database, storing data about the plurality of services.

15. The networked computer system of claim 8, wherein the node is overlaid on the graphical image generated by the first software.

16. The networked computer system of claim 8, wherein the plurality of services include elements of an information technology infrastructure.

* * * * *